(12) United States Patent
Karstens

(10) Patent No.: US 9,128,760 B2
(45) Date of Patent: Sep. 8, 2015

(54) DYNAMICALLY ADJUSTING PRIORITY BY PROVIDING A LONGER DURATION OF USE OF A SHARED RESOURCE

(75) Inventor: Christopher K. Karstens, Apex, NC (US)

(73) Assignee: International Business Machines Corporation, Armonk, NY (US)

(*) Notice: Subject to any disclaimer, the term of this patent is extended or adjusted under 35 U.S.C. 154(b) by 894 days.

(21) Appl. No.: 12/843,274

(22) Filed: Jul. 26, 2010

(65) Prior Publication Data

US 2012/0023500 A1    Jan. 26, 2012

(51) Int. Cl.
G06F 9/46    (2006.01)
G06F 9/50    (2006.01)

(52) U.S. Cl.
CPC .......... *G06F 9/50* (2013.01); *G06F 2209/5021* (2013.01)

(58) Field of Classification Search
None
See application file for complete search history.

(56) References Cited

U.S. PATENT DOCUMENTS

| 5,371,887 | A | 12/1994 | Yoshida et al. | |
|---|---|---|---|---|
| 5,542,088 | A | 7/1996 | Jennings, Jr. et al. | |
| 2006/0005150 | A1* | 1/2006 | Pankovcin | 715/853 |
| 2007/0233647 | A1* | 10/2007 | Rawat et al. | 707/3 |
| 2008/0040720 | A1* | 2/2008 | McKenney et al. | 718/103 |
| 2008/0065919 | A1* | 3/2008 | Hatasaki et al. | 713/324 |
| 2011/0239010 | A1* | 9/2011 | Jain et al. | 713/310 |

OTHER PUBLICATIONS

Cheadle, A.M., et al., "Visualising Dynamic Memory Allocators", ACM Digital Library; pp. 115-125 (Jun. 2006).

* cited by examiner

*Primary Examiner* — Greggory A Kessler
(74) *Attorney, Agent, or Firm* — Charles L. Moore; Moore & Van Allen PLLC

(57) ABSTRACT

A method to dynamically adjust priority may include providing a boost, by a processing device, to an element relative to at least one other element in response to a boost feature associated with the element being activated. Providing the boost to the element may include providing a predetermined longer duration of use of a shared use resource to the element relative to the at least one other element based on a boost setting associated with the element. The boost results in adjusting a priority of the element by allowing the element to complete a task in a shorter time period.

18 Claims, 9 Drawing Sheets

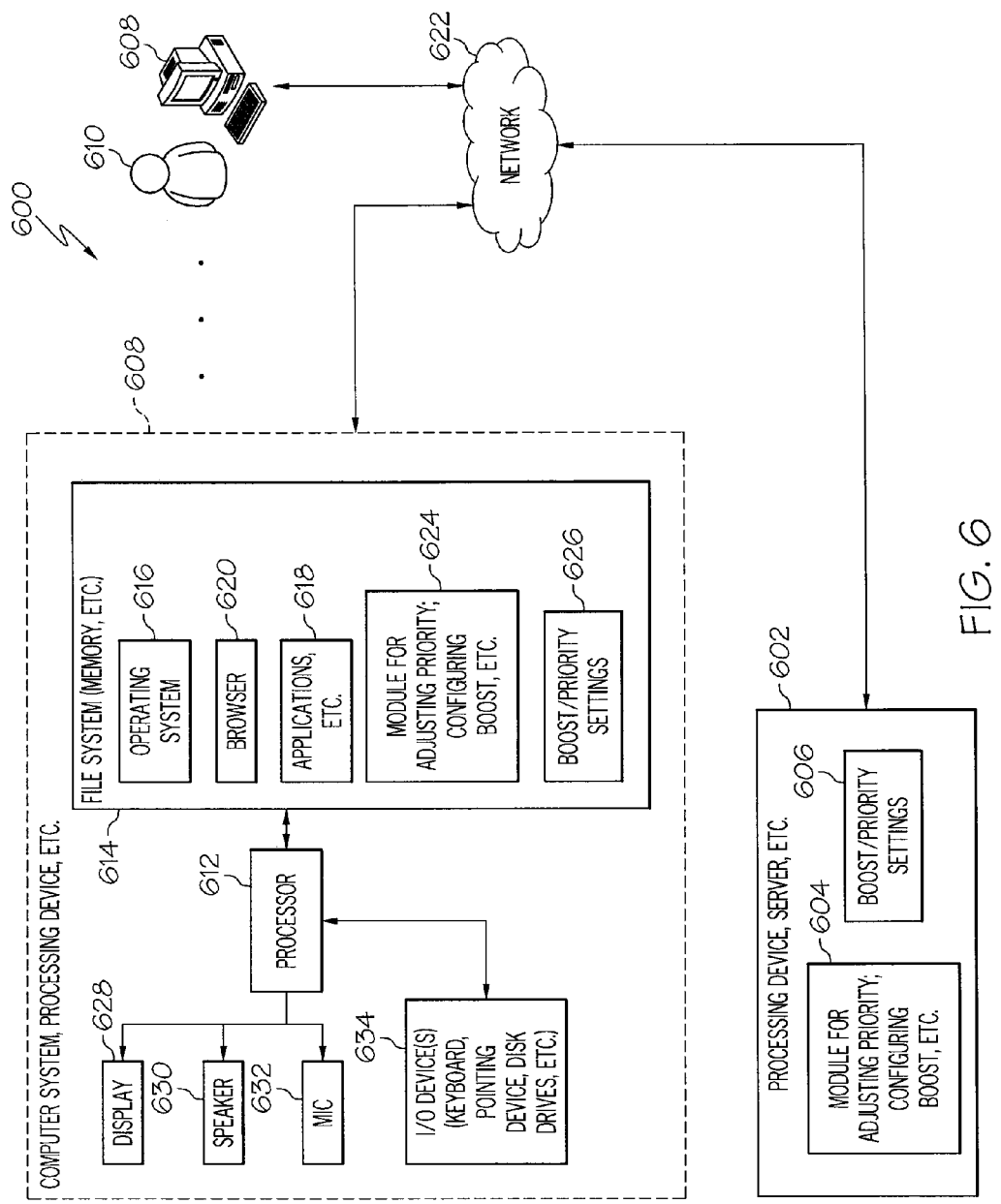

DYNAMICALLY ADJUSTING PRIORITY BY PROVIDING A LONGER DURATION OF USE OF A SHARED RESOURCE

BACKGROUND

Aspects of the present invention relate to providing communications priority, operating priority or other priority for more efficient operation of computer applications and more particularly to a method, system and computer program product for dynamically adjusting priority for communications or other purposes.

When an operator's or user's machine or communications device is constrained for network resources or other resources, the operator may need timely access to particular content. For example, the operator's customer or manager may ask a question and need an immediate response. The operator may need to pull a stock quote, or pull up an email on a mail server. Presently, when the operator's machine is constrained for network resources, the new task the operator needs to perform immediately is handled by the operating system in a time slice fashion just like all the other applications currently running on the operator's machine. For example, the operator needs to pull a stock quote, clicks a browser link directly to the stock page, waits, the page partially loads, waits some more, then times out before it provides the needed information due to too much competition for network resources on the operator's machine.

BRIEF SUMMARY

According to one aspect of the present invention, an operator or user is enabled to use a computer pointing device to specify an element that needs priority with respect to use of a resource, such as a network resource or other resource. For example, the operator may operate a boost feature, such as clicking and holding the computer pointing device, mouse button or the like, on a particular tab title, task bar entry, task manager process or application entry, window title bar, or any representative element to temporarily boost or give a predetermined percentage access up to about 100% access to any needed resource to complete a task. When the operator releases the computer pointing device, priority is removed, and normal operation may resume.

In accordance with another aspect, the element the operator clicks and holds on to boost priority may be highlighted or distinguished from other elements. For example, the element may change to a contrasting color that is different from the normal selected or non-selected state. For example, a selected tab may change to a preset color, and all remaining unselected tabs may remain a different color.

According to one aspect of the present invention, a method to dynamically adjust priority may include providing a boost, by a processing device, to an element relative to at least one other element in response to a boost feature associated with the element being activated. Providing the boost to the element may include providing a predetermined longer duration of use of a shared use resource to the element relative to the at least one other element based on a boost setting associated with the element. The boost results in adjusting a priority of the element by allowing the element to complete a task in a shorter time period.

According to another aspect of the present invention, a system to dynamically adjust priority may include a processing device. The system may also include a module operating on the processor device to provide a boost to an element relative to at least one other element in response to a boost feature associated with the element being activated. The boost provides the element a predetermined longer duration of use of a shared use resource relative to the at least one other element based on a boost setting associated with the element. The boost results in adjusting a priority of the element by allowing the element to complete a task in a shorter time period.

According to a further aspect of the present invention, a computer program product for dynamically adjusting priority may include a computer readable storage medium having computer readable program code embodied therewith. The computer readable program code may include computer readable program code configured to provide a boost to an element relative to at least one other element in response to a boost feature associated with the element being activated. The boost provides the element a predetermined longer duration of use of a shared use resource relative to the at least one other element based on a boost setting associated with the element. The boost results in adjusting a priority of the element by allowing the element to complete a task in a shorter time period.

BRIEF DESCRIPTION OF THE SEVERAL VIEWS OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein:

FIG. 6 is a block schematic diagram of an example of a system for adjusting priority or boost in accordance with an embodiment of the present invention.

DETAILED DESCRIPTION

Figure 1:
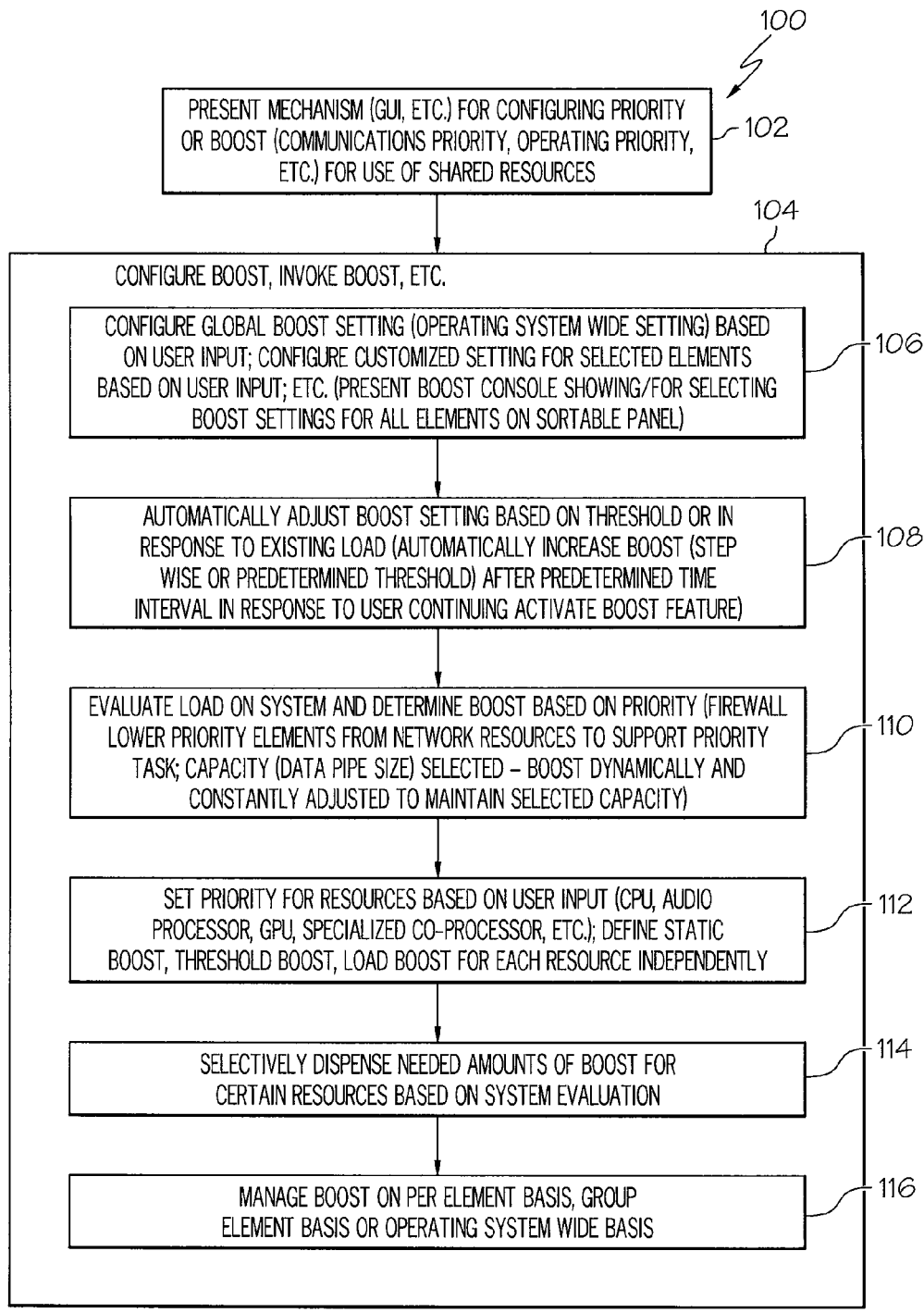
FIG. 1 is a flowchart of an example of a method for dynamically adjusting priority or boost in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As used herein element may refer to any application, operation, function or other feature operating on a system that may be provided boost to increase a priority of the element in completing a task.

As used herein, boost, boost level or similar terms may refer to an element being provided a predetermined longer duration of use of a shared use resource relative to other elements based on a boost setting or level of boost associated with the element. The boost may adjust a priority of the element to which the boost is applied or associated to allow the element to complete a task in a shorter period of time than under normal operating conditions or to complete the task more efficiently. The boost or boost level may be a percentage of the capacity of a particular resource being shared by other elements.

In another aspect, the boost may be a number of time slices or time slots provided to each element sharing a resource. Accordingly, the boost may provide a preset number of additional time slices or time slots to the element being provided boost compared to other elements currently using the resource.

System may refer to any machine, communications device, computer system or device, virtual computing environment, cloud computing environment or other device that may utilize the boost feature to adjust priority of an element similar to that described herein.

Resource may include but is not necessarily limited to a network resource, computer system resource, cloud computing resource or other entity that an element may share the use of with other elements.

FIG. 1 is a flowchart of an example of a method 100 for dynamically adjusting priority in accordance with an embodiment of the present invention. In block 102, a mechanism may be presented to a user for configuring a priority or boost for use of a resource or a selected resource or resources. The priority may be a communications priority, operating priority or other priority for use of the resource or resources to complete a task. The mechanism may be a graphical user interface or similar arrangement. An example of a mechanism that may be used to configure boost or priority will be described with reference to FIG. 2. Another example of a mechanism for configuring boost or priority will be described with reference to FIG. 3.

In block 104, the boost may be configured and boost may be invoked in response to activating a boost feature. The boost feature may be activated by operating a computer pointing device to select an element to which boost is to be applied. For example, a computer pointing device, mouse or the like may be used to clicked-on or otherwise operated to select a tab title, task bar entry, window title bar, or other representative artifact or feature associated with an element to activate the boost feature and provide boost to the element to adjust the priority of the element as described herein. The blocks or operations within block 104 and described below may be used in conjunction with one another or may represent different implementations or aspects of the invention. For example, a user may select to use different implementations of the boost feature described herein based on different circumstances, the types of elements to which boost may be applied, the types of resources or other considerations or criteria.

Figure 2:
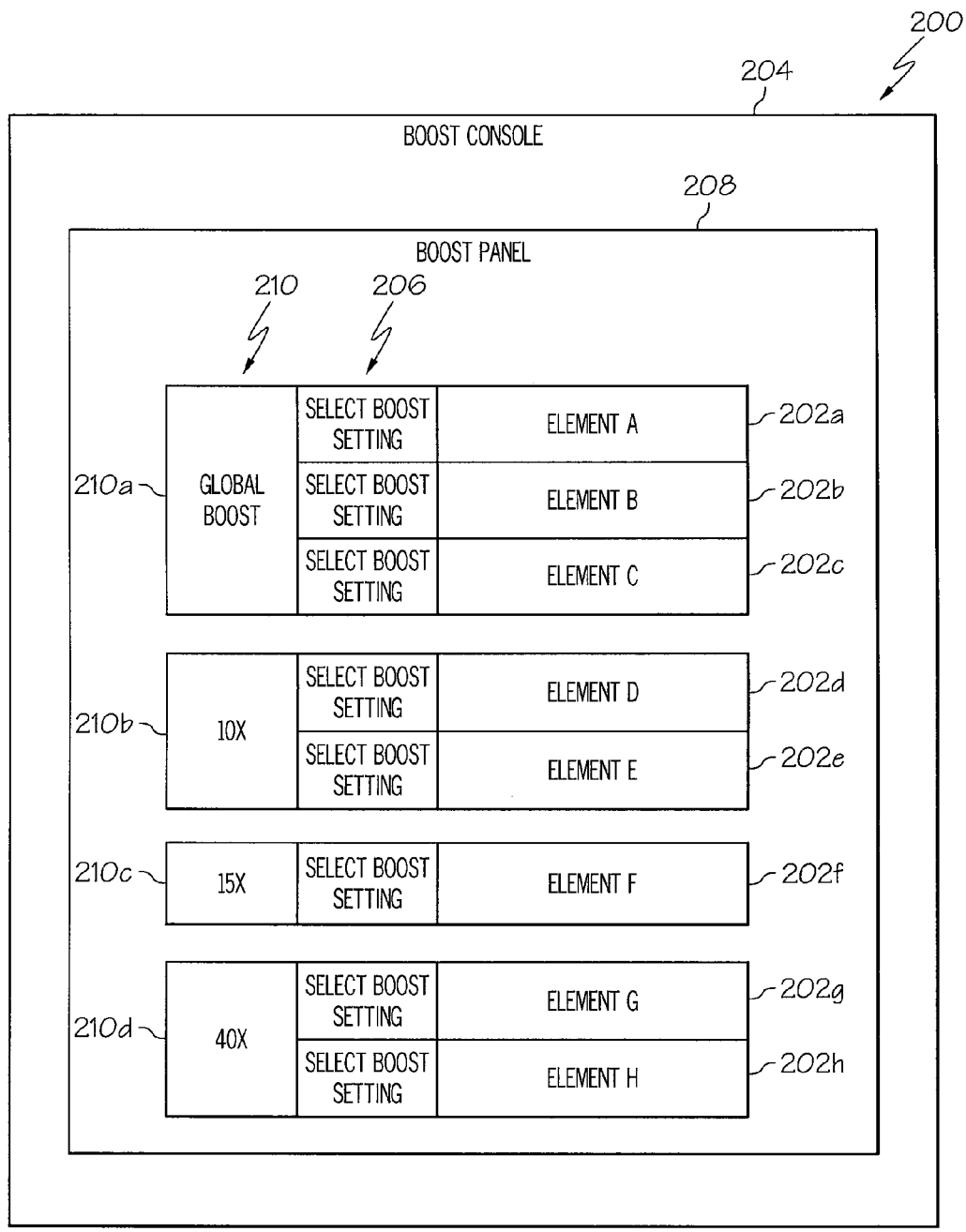
FIG. 2 is an example of a graphical user interface (GUI) for configuring priority or boost in accordance with an embodiment of the present invention.

In block 106, a boost setting may be configured or set for each element based on user input. A global boost setting may be configured or set for each element. The global boost setting may be an operating system wide boost setting. Customized boost settings may be configured or set for selected elements based in user input. As previously discussed, a GUI or boost console or panel may be presented for selecting and presenting the boost settings for the selected elements. Each element and its selected boost may be presented in the boost console. The boost console may include a sortable panel with each of the elements sorted or grouped according to their associated boost setting. An example of a boost console and sortable panel is illustrated in FIG. 2 and will be described in more detail below. A user may multi-select elements in a sortable panel and set the multi-selected group to a particular boost setting.

In block 108, a boost setting may be automatically adjusted based on a preset threshold or in response to an existing load. The boost or boost setting may be automatically increased in a step wise manner or based on preset thresholds after a predetermined time interval in response to the user continuing to activate a boost feature. For example, an operator or user may invoke boost on a particular element. After a predetermined time interval, e.g., 10 seconds have elapsed and the operator is still operating or activating the boost feature, the boost may automatically become more aggressive and may increase in amount or level. For example, after a particular data threshold or time threshold, boost can increase by a preset amount or percentage. In another example, boost may continue to increase by a preset amount or percentage after the expiration of each predetermined time interval until a maximum boost (or operator specified ceiling boost) is reached. The increases in boost may be temporary just for that particular invocation. When boost is released, and then invoked again in the future, boost will start at the normal specified boost level. Boost does not have to gradually scale up. Boost may increase from a normal level to 100% capacity of a particular resource, such as a network or computing resource, after a single time threshold is reached.

The thresholds may vary for time and data. There may be any number of thresholds specified. For example, the first threshold may be after 10 seconds increase boost another 20× if possible. The second threshold may be after 7 additional seconds increase boost another 20× if possible, and the third threshold may be after a further 4 seconds increase boost 50× if possible.

In block 110, a boost implementation or feature may evaluate a load on the system or machine and determine how best to get priority for an element to more efficiently complete a task. In one example, a resource, such as a network resource, computing resource or other resource, may be constrained. The boost feature may identify two other elements that are consuming 70% of the capacity of the resource. The boost implementation or feature, when invoked, may automatically firewall the two particular elements consuming most of the resource capacity to support the operator's or user's choosing to provide boost to a selected element to increase the priority of the element to more efficiently complete a task being performed by the element.

In another example, the operator or user may specify that a selected capacity of a resource be maintained. For example, the user may specify that a 100 KB pipe or communications link be maintained for a web browser. The boost implementation or feature may dynamically and constantly adjust the boost setting to maintain the capacity of the resource or in this example, the size or capacity of the data pipe. The more network load on the system, the more aggressive the boost implementation will have to be to get constrained resources. The less network load on the system, the less aggressive the boost implementation will have to be to maintain the operator desired pipe or capacity.

In block 112, priority for resources may be set based on user input. Examples of different resources for which a priority may be set or selected may include but is not necessarily limited to a central processing unit (CPU), audio processor, graphical processing unit (GPU), specialized co-processor or other resource. Different types of boost may also be defined. Examples of different types of boost may include static boost, global boost, threshold boost, load boost for each resource and the like. Static boost may be a preset amount or level of boost by which the boost may be increased after a predetermined time interval or each of a series of predetermined time intervals if the user continues to operate the boost feature. As previously discussed, the global boost may be an operating system wide boost setting. Global boost may also be a preset boost applicable to all elements of a certain type. For example, all browser applications may have a predefined boost. The global boost may also be a default boost for any elements for which a custom boost has not been configured. A threshold boost may be a preset boost that may be set for different thresholds of time or data similar to that described herein. A load boost may be a boost that may be applied to maintain a certain capacity of an element or resource. The load boost may be variable based on changes in demand or a particular element or resource. The boost for each resource may be managed independently. Different types of boost and combinations of boost may also be defined. Each type of boost has a certain behavior. An operator may prefer a first boost behavior under a first set of conditions and a second boost behavior under a second set of conditions. The operator can configure two or more types of boost for a single resource and the conditions to activate each type of boost. The conditions may be set to allow two or more types of boost to be active simultaneously.

In block 114, needed amounts of boost may be selectively dispensed for certain resources based on system evaluation. For example, if the network resources are not an issue for the priority element, the boost implementation or feature will not boost network resources when boost is invoked. If CPU resources are constrained, the boost implementation can identify that one other element may be using a significant amount of the CPU, e.g., 96%. The boost feature can "firewall" that element from CPU resources to support the priority element.

In another example, the boost implementation may automatically and constantly increase or decrease network boost and CPU boost independently for a priority element. For example, the boost implementation may maintain the same network boost over a five minute period, while simultaneously adjusting the CPU boost widely in response to system load during that same five minutes.

In block 116, boost may be managed on a per element basis, a group element basis or an operating system wide basis. Managing boost on a per element basis may involve providing boost to one element over other elements in the same application. For example, a web browser may have five web page tabs currently loaded. When boost is activated for a particular tab, the web page associated with that tab only gets priority over the web pages associated with the other four tabs. An example of providing boost to a particular web page of a group of currently open web pages will be described with reference to FIGS. 5A-5D.

Managing boost on a per group of elements basis may involve providing boost to one element over other elements in a group of elements. For example, a web browser application and a media player application may be placed in a first boost group. When boost is activated for a selected application or element, the selected application or element is only competing for resources over the other elements and applications in the same group.

Managing boost on an operating system wide basis may involve providing boost to one element over other elements operating on the entire system. For example, a computer pointing device may be used to select a tab, title bar or other boost feature associated with an element to provide boost based on the boost settings or priority settings for all shared resources or selected resources over all other elements or applications currently running on the system.

FIG. 2 is an example of mechanism or a graphical user interface (GUI) 200 for configuring boost in accordance with an embodiment of the present invention. The mechanism or GUI 200 for configuring boost or boost setting of each element 202a-202h as illustrated in FIG. 2 may include a boost console 204 for selecting a boost for each element 202a-202h. The boost console 204 may include a feature 206 associated with each element 202a-202h to select or enter a boost setting.

The boost console 204 may include a sortable panel 208 for grouping elements based on the selected boost 210 of each element. A user may multi-select elements in the panel 208 and set the multi-selected group to a particular boost setting. In the example illustrated in FIG. 2, Element A 202a, Element B 202b and Element C 202c are all illustrated as having a "Global Boost" or being in a Global Boost group 210a. The Global Boost may define a default or a standard amount or level of boost for an element whenever a boost feature associated with the element is activated to provide the selected boost to the element.

Element D 202d and Element E 202e each have a 10× boost or are in a 10× boost group 210b. Accordingly, when a boost feature associated with Element D 202d or Element E 202e is activated, the element will be provided with ten times a much capacity or time slices for use of a shared resource as other elements each time it is the elements turn to utilize the resource in a round robin type sharing scheme. Similarly, Element F 202f is in a 15× boost group 210c and would receive 15× as much capacity or time slots for use of the shared resource compared to other elements sharing use of the resources in response to the boost feature associated with Element F 202f being activated. Element G 202g and Element H 202h are illustrated as being in a 40× boost group 210d and would each receive 40× capacity or time slots or slices compared to other elements in response to the boost feature associated with Element G 202g or Element H 202h being activated.

The boost feature may include but is not necessarily limited to operating a computer pointing device or the like to click-on or otherwise select a tab, task bar entry, window title bar or any representation associated with the element that may be used to activate the boost feature. The element would return to a normal boost in response to the associated boost feature being inactive. The boost feature may be inactivated by un-clicking the feature associated with the element for activating the boost.

Figure 3:
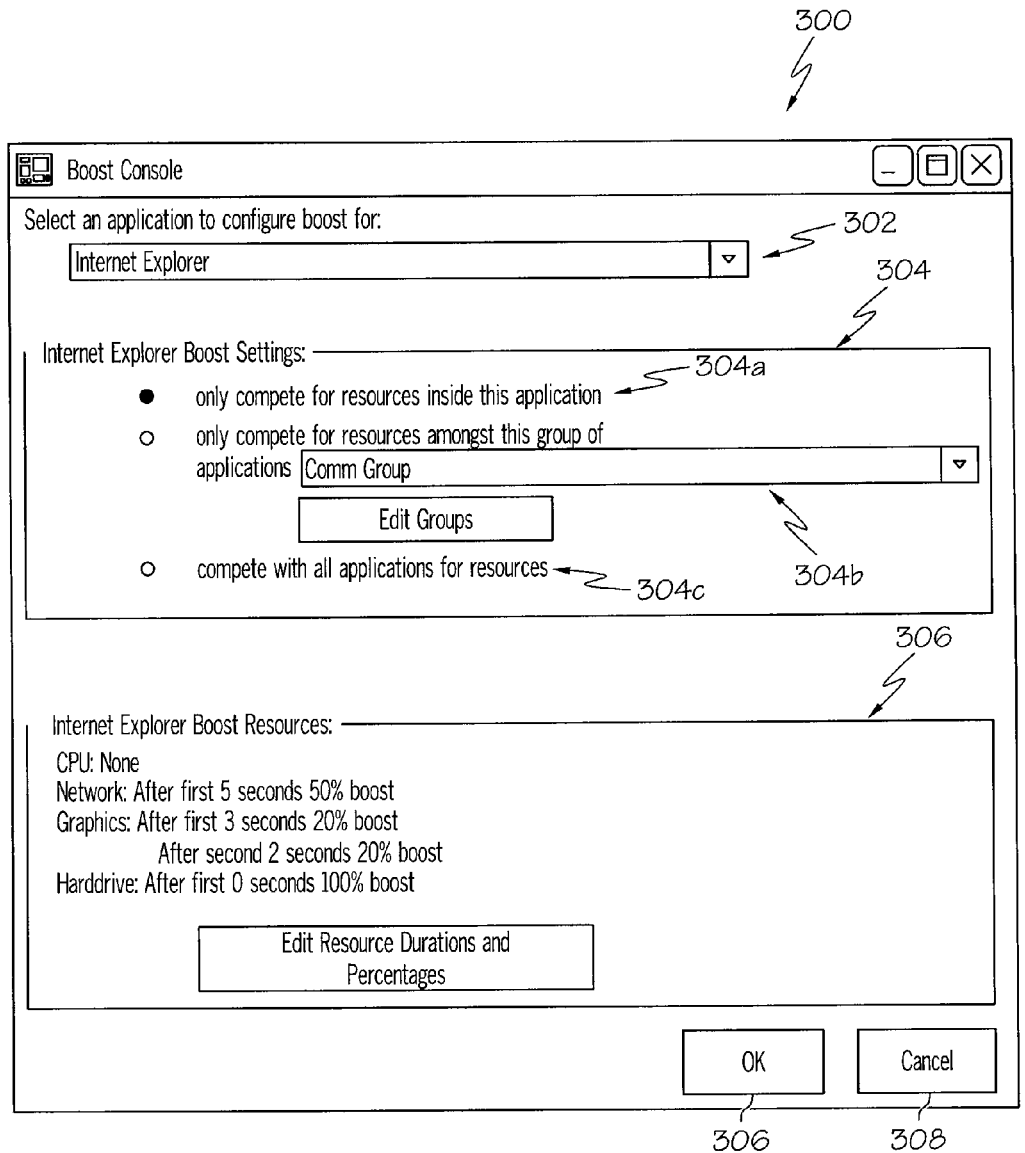
FIG. 3 is an example of a graphical user interface (GUI) for configuring priority or boost in accordance with another embodiment of the present invention.

FIG. 3 is an example of a graphical user interface (GUI) or boost console 300 for configuring priority in accordance with another embodiment of the present invention. The boost console 300 may include a mechanism 302 or feature for entering or selecting an application or element for which the boost is being configured. As illustrated in FIG. 3, the mechanism 300 may be a drop down menu to select the element for which boost is being configured, although other means or mechanisms as known in the computing arts may also be used to select the element for configuring boost.

The console 300 may also include a feature 304 for selecting management of the boost on a per element or application basis 304a, on a per group basis or a system wide basis 304c.

The console 300 may also include a feature 306 for configuring an amount or percentage of boost for each type of resource and a predetermined time interval for automatically increasing boost in response to the boost feature associated with the element being continuously operated or active by the user or operator. The console may also include an "OK" button 306 and a "Cancel button 308." Operation of the "OK" button 306 accepts and stores the boost configuration for use when the boost feature associated with the configured element is activated. The "Cancel" button 308 may be used to cancel the settings for the configured element.

Figure 4:
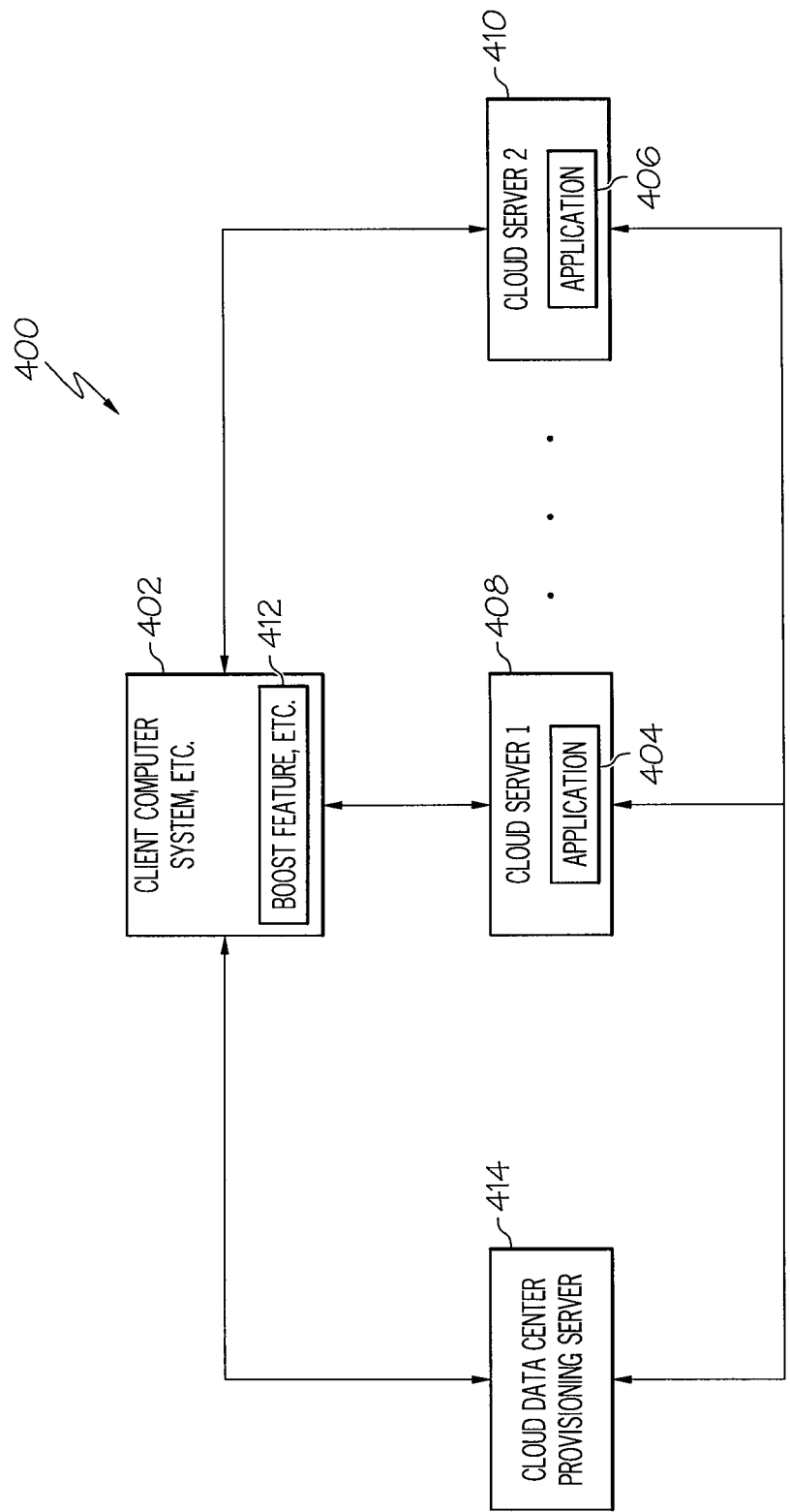
FIG. 4 is a block schematic diagram of an example of a cloud or virtual computing environment and using priority or boost to allocate resources in accordance with an embodiment of the present invention.

FIG. 4 is a block schematic diagram of an example of a cloud or virtual computing environment 400 and using priority or boost to allocate resources in accordance with an embodiment of the present invention. A client computer system 402 may connect to two or more cloud applications or elements 404 and 406. Each application 404 and 406 may be running on separate, remote cloud servers 408 and 410 respectively. To a user of the client computer system 402, the windows of the cloud applications 404 and 406 are seamless with the rest of the operating system windows of the client computer system 402. If the user operates or activates a boost feature 412 associated with an application running locally on the client computer system 402, the boost feature initially manages the resources locally on the client computer system 402.

If the user operates or activates a boost feature 412 associated with one of the applications 404 or 406 running on the remote cloud servers 408 and 410, the boost feature 412 initially manages resources on the particular remote server 408 or 410 for whichever application 404 or 406 has its boost feature operated. Optionally, if the boost feature 412 can not allocate the resources to satisfy the operator or user in a timely manner (whether locally or remotely), the boost feature 412 may communicate with a cloud data center provisioning server 414 to relocate part of an application or all of an application where additional resources are available that can satisfy the operator's needs. For example, assume the operator is working with a spreadsheet on cloud server 408. The operator is performing intensive analysis on the spreadsheet and is using the boost feature 412 to get more resources for processing the spreadsheet. Two thresholds expire and the operator is still activating or operating the boosting feature 412. The boost feature 412 may communicate with a cloud data center provisioning server 414 and communicate the operator's needs. The provisioning server 414 may locate cloud server 410 with sufficient resources. The provisioning server 414 sees that the same spreadsheet application is on both cloud servers 408 and 410, and thus only moves the operator's data and in-process analysis files to cloud server 410. Cloud server 410 completes the spreadsheet analysis in a shorter time period as a result of the provided boost. The operator may inactivate the boost feature after the analysis or the boost feature may automatically be inactivated in response to the analysis being completed. The provisioning and data movement may be completely transparent to the operator.

FIGS. 5A-5D illustrate another example of applying the priority or boost feature in accordance with an embodiment of the present invention. Three web browser tabs 502, 504 and 506 are illustrated in the example in FIGS. 5A-5D. An operator or user can only view content of a web page for a web page tab that currently has focus. The web page tab that currently has focus may be highlighted or otherwise distinguished from the other web page tabs. For example, the web page tab with focus may be a different color from the other web page tabs. In the example illustrated in FIGS. 5A-5D the web page tab with focus is illustrated by cross-hatching to illustrate a different color. Accordingly, in FIG. 5A web page tab 502 for web page #1 is cross hatched to illustrate that it may be different color compared to the other web page tabs 504 and 506 to designate that the web page #1 associated with web page tab 502 currently has focus and is being presented on a display to the user or operator.

Figure 5A:
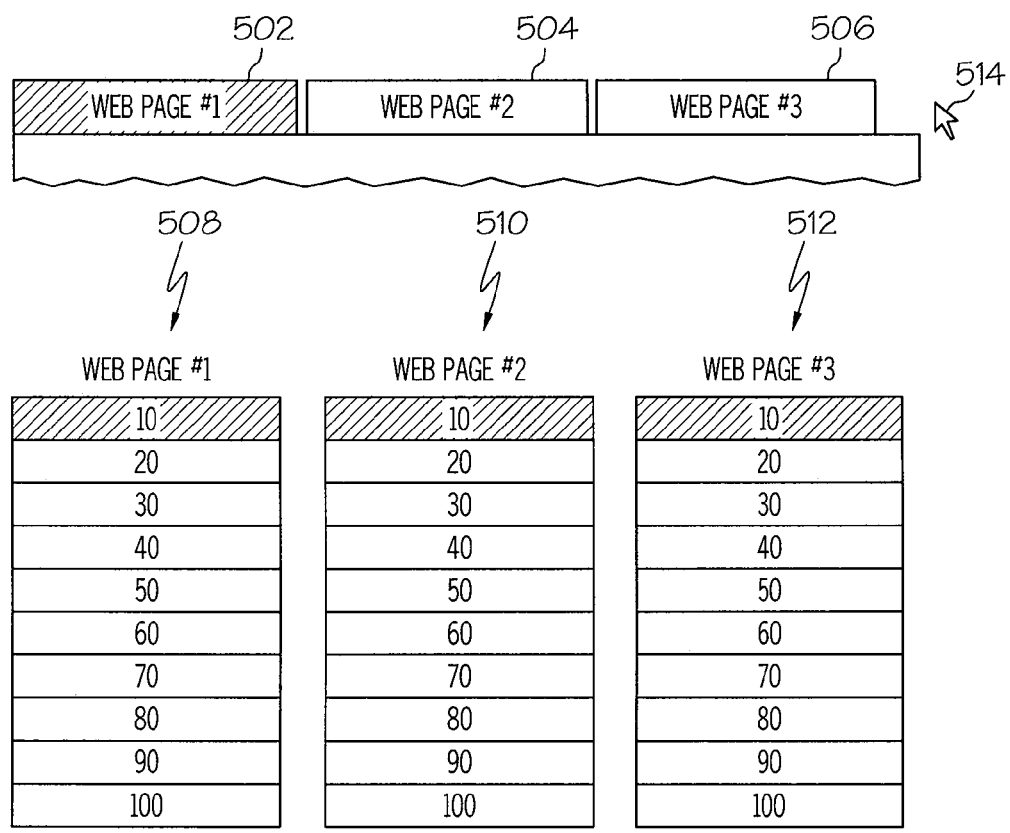
FIGS. 5A-5D illustrate an example of applying the priority or boost feature in accordance with an embodiment of the present invention.

FIG. 5A also illustrates a loading chart 508, 510 and 512 for each of the web pages. Each of the web pages have loaded about 10% as illustrated by the cross hatched "10" section of each respective loading charts 508, 510 and 512 in FIG. 5A after a certain time interval. The cross-hatching may illustrate a color to represent the loading or some other designation or arrangement may be used to illustrate the amount of completion of the loading.

Figure 5B:
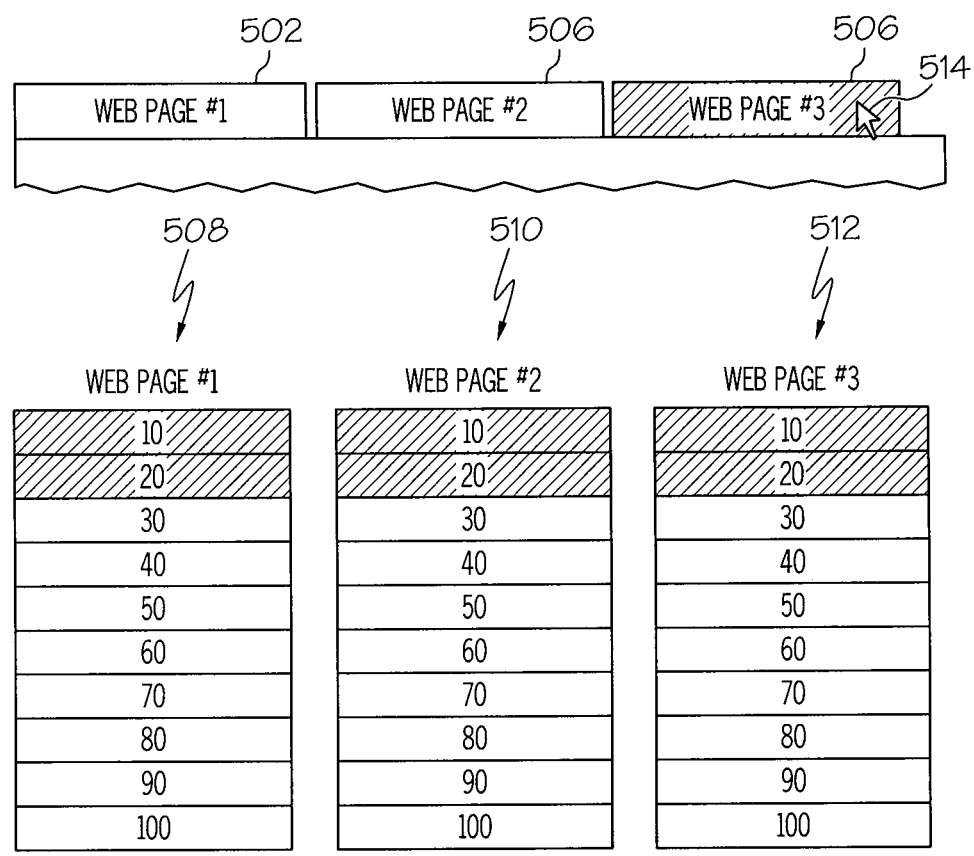
Figure 5C:
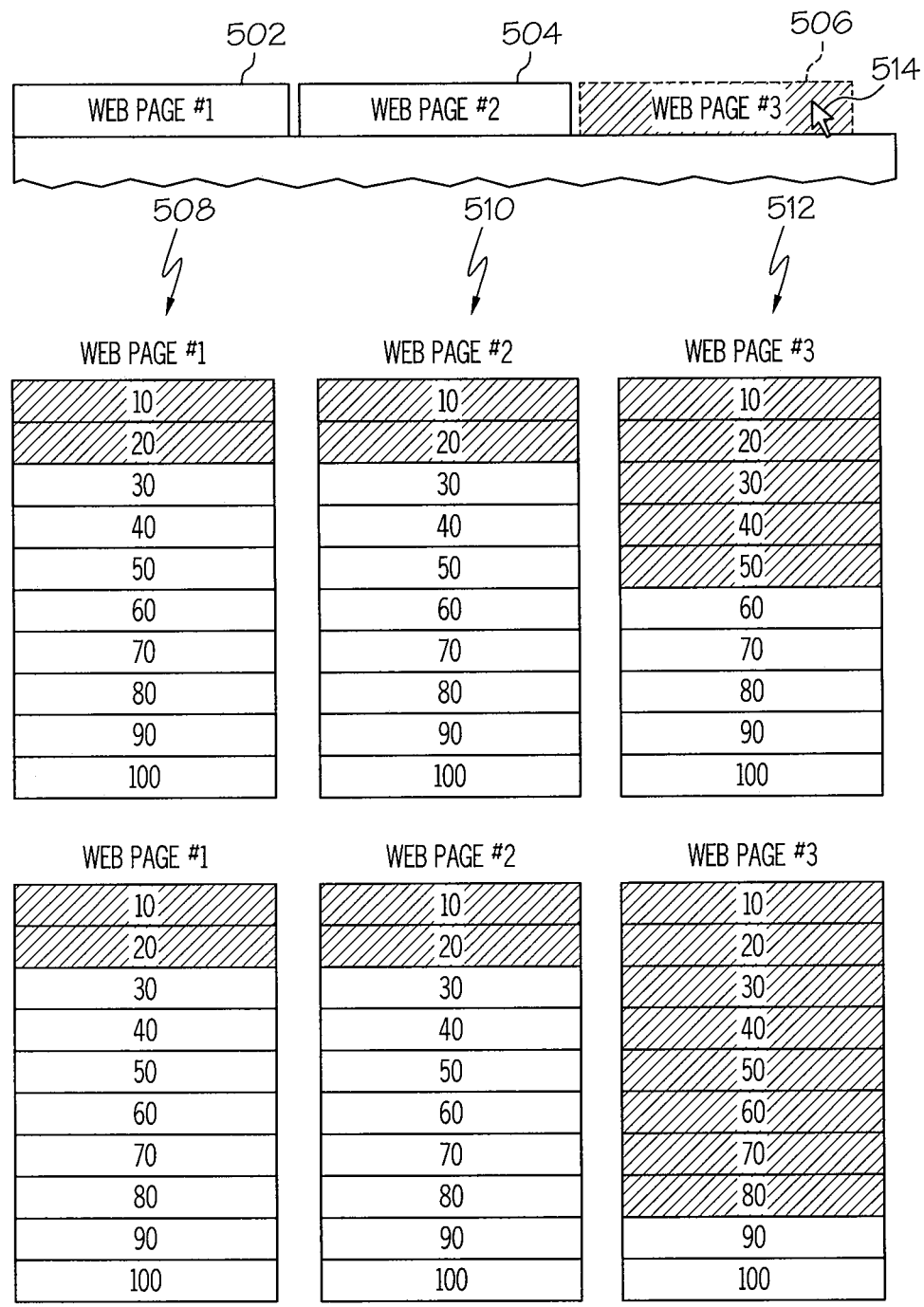

In FIG. 5B, a computer pointing device 514, such as a mouse cursor or other computer pointing device, may be operated to move the focus to web page #3, associated with web page tab 506. The loading charts 508, 510 and 512 illustrate that each of the web pages have now loaded 20% as illustrated by the cross-hatched "20" section of each respective loading chart 508, 510 and 512. To provide boost to the loading of web page #3, a user or operator may activate a boost feature associated with web page #3. In the example illustrated in FIG. 5C, the user may operate the computer pointing device, such as depressing and holding down a mouse button to provide the boost feature to web page #3. The web page tab 506 associated with web page #3 may be highlighted or otherwise distinguished from the other web page tabs 502 and 504 to indicate to the user that the boost is being applied to web page #3 to provide priority to web page #3 and shorten the time period for loading web page #3 compared to loading without activating the boost feature. In FIG. 5C, the broken line bordering web page tab 506 for web page #3 illustrates the highlighting or distinguishing of the web page tab 506 to indicate activation or operation of the boost feature. The loading chart 512 for web page #3 also illustrates that the priority of web page #3 has been adjusted or increased based on the boost and is loading much faster compared to the other web pages #1 and #2. For example after a predetermined time interval has elapsed with the user continuing to operate the computer pointing device 514 on the tab 506 to provide boost, web page #3 has loaded to about 50%. After another predetermined time interval with the user continuing to operate the boost feature, the loading chart 512 for web page #3 illustrates that about 80% of web page #3 has loaded.

Figure 5D:
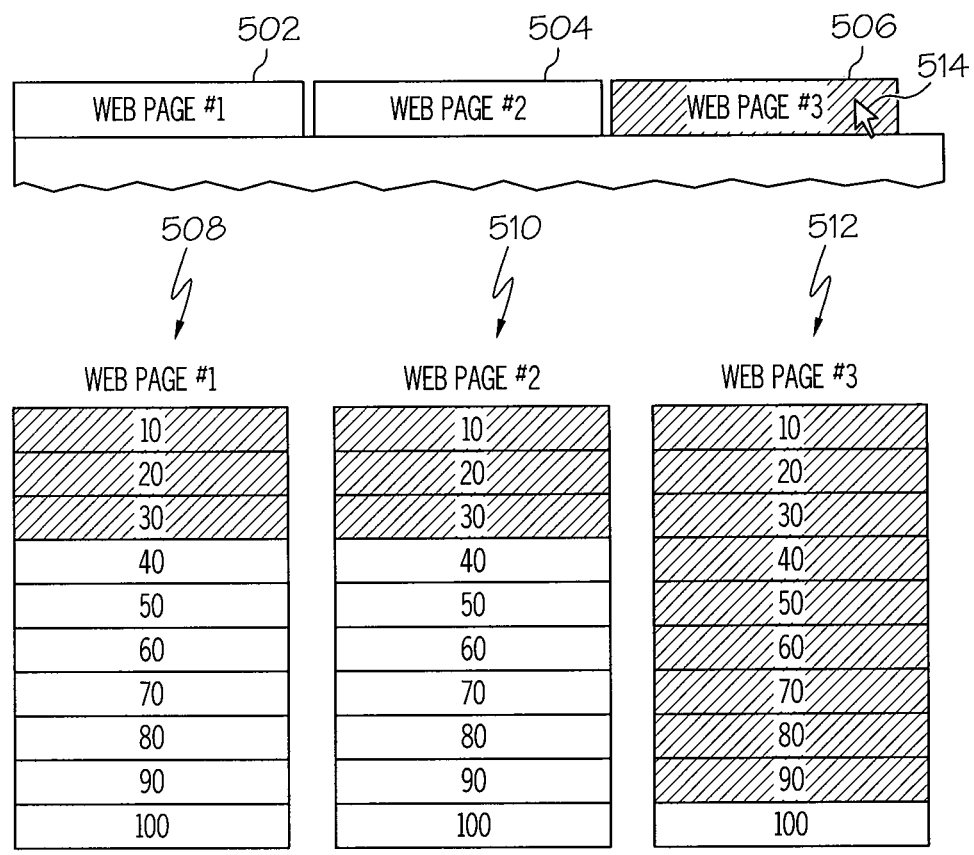

In FIG. 5D, the user has inactivated the boost feature by releasing the computer pointing device 514. The web page tab 506 for web page #3 may return to its normal color or condition. The boost for web page #3 may return to its normal level and web page #3 may continue to load at the same rate as web pages #1 and #2 as illustrated in FIG. 5D.

FIG. 6 is a block schematic diagram of a system 600 for adjusting priority in accordance with an embodiment of the present invention. The method 100 of FIG. 1 may be embodied in or performed by the system 600. The system 600 may include a processing device 602. The processing device 602 may be a server or similar processing device. A module for adjusting priority and configuring boost 604 may operate on the server or processing device 602. Boost or priority settings 606 may be stored on the processing device 602 or in association with the processing device 602.

The boost feature described herein may also be embodied in or operate on a computer system 608 or other processing device used by an operator or user 610. The computer system 608 may be any sort of computing device or processing device and may include a communications device such as a mobile or handheld computer or communications device. The method 100 may be embodied in and performed by the computer system or processing device 608 rather than the server 602. The computer system 608 may include a processor 612 to control operation of the computer system 608 and a file system 614, memory or similar data storage device. An operating system 616, applications 618 and other programs may be stored on the file system 614 for running or operating on the processor 612. A web or Internet browser 620 may also be stored on the file system 614 for accessing the processing device 602 or server via a network 622. The network 622 may be the Internet, an intranet or other private or proprietary network.

A module 624 for adjusting priority and configuring boost similar to that described herein may also be stored on the file system 614 and operable on the processor 612. The method 100 described with reference to FIG. 1 may be embodied in the module 624. Boost and priority settings 626 may also be stored on the file system 614 for performing the operations associated with module 624. In at least one embodiment, the boost and priority settings 626 may be stored on the file system 614 rather than the processing device 602.

The computer system 608 may also include a display 628, a speaker system 630, and a microphone 632 for voice communications. The computer system 608 may also include one or more input devices, output devices or combination input/output devices, collectively I/O devices 634. The I/O devices 634 may include a keyboard or keypad, pointing device, such as a mouse, disk drives and any other devices to permit a user, such as user 610, to interface with and control operation of the computer system 608.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A method to dynamically adjust priority, comprising:
   providing a boost, by a processing device, to an element relative to at least one other element in response to a boost feature associated with the element being activated;
   wherein providing the boost to the element comprises providing a predetermined longer duration of use of a shared use resource to the element relative to the at least one other element based on a boost setting associated with the element, the boost adjusting a priority of the element by allowing the element to complete a task in a shorter time period;
   presenting a graphical user interface comprising a feature for selecting management of the boost on at least one of a per element basis, a group of elements basis and an operating system basis, wherein presenting the graphical user interface comprises providing a field in the graphical user interface for entering or selecting the boost setting, wherein presenting the graphical user interface comprises presenting a boost console for selecting the boost setting for each element, wherein the boost console comprises a sortable panel to group elements based on the selected boost setting of each element.

2. The method of claim 1, further comprising providing a field associated with each of a plurality elements represented in the graphical user interface, the field associated with each element for entering or selecting the boost setting for the associated element.

3. The method of claim 1, further comprising automatically increasing the boost setting in response to the boost feature being continuously activated after a predetermined time interval.

4. The method of claim 3, further comprising automatically increasing the boost setting in predetermined increments after each predetermined time interval elapses in response to the boost feature being continuously activated after each predetermined time interval.

5. The method of claim 1, further comprising increasing the boost setting in response to the boost feature being continuously activated after each of a set of predetermined time intervals, wherein each of the set of predetermined time intervals may be configured to a different time duration.

6. The method of claim 5, further comprising allowing configuration of a different amount of boost setting for each of the set of predetermined time intervals.

7. The method of claim 1, further comprising:
   evaluating an amount of the shared use resource being used by each element; and
   providing the boost based on the amount of the shared use resource being used by each element and based on the boost setting associated with each element.

8. The method of claim 1, further comprising applying a firewall to the at least one element relative to the resource to provide the priority for completing the task.

9. The method of claim 1, further comprising:
   allowing a capacity of a selected resource to be set; and
   dynamically and constantly adjusting a boost level to maintain the set capacity of the selected resource.

10. The method of claim 1, further comprising selectively dispensing an amount of boost based on an evaluation of a need for the amount of boost.

11. The method of claim 1, further comprising switching from one cloud server to another cloud server in a cloud computing environment based on a requested level of boost, wherein switching from one cloud server to another cloud server comprises:
    communicating by a boost feature on a client computer system to a cloud data center provisioning application that additional resources are required in response to the boost feature being unable to allocate the resources to satisfy requirements of an application using the one cloud server; and
    relocating at least part of an application to the other cloud server in response to cloud data center provisioning application determining that the other cloud server include resources to satisfy the requirements of the application.

12. The method of claim 1, further comprising returning the element to a previous boost setting in response to the boost feature associated with the element becoming inactive.

13. The method of claim 1, entering or selecting the boost setting of the element comprises entering or selecting a number of times longer the duration of use of the shared use resource by the element is relative to the at least one other element.

14. A system to dynamically adjust priority, comprising:
    a processing device; and a module operating on the processing device to provide a boost to an element relative to at least one other element in response to a boost feature associated with the element being activated;

wherein the boost provides the element a predetermined longer duration of use of a shared use resource relative to the at least one other element based on a boost setting associated with the element, the boost adjusting a priority of the element by allowing the element to complete a task in a shorter time period; and a module for presenting a graphical user interface comprising a feature for selecting management of the boost on at least one of a per element basis, a group of elements basis and an operating system basis, wherein the graphical user interface comprises a boost console, the boost console comprising a field associated with each of a plurality of elements represented in the boost console, the field associated with each element for entering or selecting the boost setting for the associated element and the boost console further comprising a sortable panel to group elements based on the selected boost setting of each element.

15. A computer program product for dynamically adjusting priority, the computer program product comprising:

a computer-readable storage medium having computer-readable program code embodied therewith, the computer-readable program code comprising:

computer-readable program code configured to provide a boost to an element relative to at least one other element in response to a boost feature associated with the element being activated; wherein the boost provides the element a predetermined longer duration of use of a shared use resource relative to the at least one other element based on a boost setting associated with the element, the boost adjusting a priority of the element by allowing the element to complete a task in a shorter time period; and computer-readable program code configured to present a graphical user interface comprising a feature for selecting management of the boost on at least one of a per element basis, a group of elements basis and an operating system basis, wherein the graphical user interface comprises a boost console, the boost console comprising a field associated with each of a plurality of elements represented in the boost console, the field associated with each element for entering or selecting the boost setting for the associated element and the boost console further comprising a sortable panel to group elements based on the selected boost setting of each element.

16. The computer program product of claim 15, wherein the computer-readable program code further comprises computer-readable program code configured to return the element to a previous boost setting in response to the boost feature associated with the element becoming inactive.

17. The computer program product of claim 15, wherein the computer-readable program code further comprises computer-readable program code configured to automatically increase the boost setting in response to the boost feature being continuously activated after a predetermined time interval.

18. The computer program product of claim 15, wherein the computer-readable program code further comprises computer-readable program code configured to automatically increase the boost setting in predetermined increments after each predetermined time interval elapses in response to the boost feature being continuously activated after each predetermined time interval.

* * * * *